July 1, 1969 A. D. McINTURFF 3,453,378

SUPERCONDUCTIVE JOINT

Filed Jan. 19, 1967

INVENTOR.
ALFRED D. McINTURFF

BY

Gerald G. Koris

ATTORNEY 3,453,378

SUPERCONDUCTIVE JOINT

Alfred D. McInturff, Canoga Park, Calif., assignor to North American Rockwell Corporation, a corporation of Delaware Filed Jan. 19, 1967, Ser. No. 610,399
Int. Cl. H02g *15/08;* H01f *7/22*
U.S. Cl. 174—94 8 Claims

ABSTRACT OF THE DISCLOSURE

A superconductive joint between two sections of superconductor wire is provided. The present joint includes a superconductive shunt which bypasses current around the point where the two superconductor wires have been joined. The ends of two sections of normal metal-clad superconductor wire are butt welded together and a plurality of small diameter superconductor wires are stranded around the larger conductor for a distance on either side of the weld. The strands are held in position with solder.

The present invention relates to a junction between two superconductor wires, and more particularly to a superconductive shunt across such a junction.

Superconductivity is the property of certain materials at cryogenic temperatures approaching absolute zero to carry currents without power dissipation. The factors affecting the current density at which a superconductive material ceases to function as such are the interrelation of magnetic field strength and temperature. The magnetic field strength, applied externally or generated by a current in the superconductor, limits superconducting critical transport current density at a given temperature T, T being less than the critical temperature $T_c$. $T_c$ is the highest temperature at which a material will superconduct. Similarly, at a given field strength, an increase in temperature and/or current density can terminate superconductivity. The supercurrent-carrying capacity of superconductors provides the basis for the fabrication of magnets which have little or no power loss. This has numerous applications, for example, in high energy physics devices, lasers, bubble chambers, transformers, and long distance electrical transmission.

Superconducting devices display the tendency, for reasons not thoroughly understood but believed to include application of excessive current or by local heating, to undergo a transition from the superconductive state to a normal conductive state, after which a superconductive condition can be reestablished. This transition, which is called a superconducting/normal or SN transition, causes large induced voltage drops to appear across the superconducting magnet when the strong fields collapse. Such voltage bursts may damage superconducting solenoids in addition to rendering them inoperative for short periods or permanently.

The tendency to undergo SN transitions is particularly pronounced at junctions between superconductor wires because the metallurgical characteristics of the materials at the interface are affected by the joining method utilized. As is known, superconducting properties of a given alloy are influenced by the metallurgical history and properties of the material. Joining ends of superconductor wires by such means as welding, therefore, alters the metallurgical history from the optimum. Nonetheless, junctions between strands of superconductor wires are frequently necessary for many reasons. For example, there are certain practical limitations on the length of superconductor wire which can be drawn in one section. Thus, swaging machines are limited in the weight of a billet which they can handle, and as larger cross section superconductor wires are drawn, the lineal length of a wire produced from a given billet charge is reduced. The cost of producing superconductor wire also increases proportionately with an increase in unbroken length. Further, breakages in production of wire or assembly of solenoids running to many thousands of feet in length are bound to occur, particularly in view of the often brittle nature of superconductor wire. The inherently brittle nature of wires of such known superconductors as titanium-niobium, niobium-zirconium, and the like, are increased by metallurgical processing such as cold work and heat treatments designed to increase their superconducting properties.

Various methods have been utilized to make joints between superconductor wires. For example, pressure-type connections are made with clamping screws on terminal strips, outside a superconducting solenoid but still within a liquid helium bath. Since such joints are nonsuperconducting, means must be found for dissipation of the energy released, and persistent currents (i.e., continuous current flow with no degradation or voltage drop, not requiring further current input) are not realizable. Superconductive joints have been made utilizing solders such as copper-brass, tin-silver, and indium. Pressure joints have also been made between sections of superconductor wire with and without the use of sleeves over the joint section. These methods of making connections are not entirely satisfactory and the junctions display a high statistical frequency of SN transitions. An SN transition at a given point tends to be propagated throughout a solenoid, changing it from superconducting to nonsuperconducting, unless stabilized. Because of the large voltages generated by such transitions, time must be allowed for the solenoid to recover by dissipating heat and returning to below the critical temperature. In view of these considerations, the provision of a satisfactory and reliable superconductive joint has warranted considerable attention.

The principal object of the present invention, accordingly, is to provide an improved superconductor joint and method of making same.

Another object is to provide a superconductive joint between two superconductor wires wherein the junction will pass as much current as an unbroken length of wire under the same conditions, with a minimal amount of power dissipation.

Another object is to provide such a junction which will not display any greater tendency to undergo SN transitions than the parent conductor.

Still another object is to provide a superconductive shunt across two joined ends of a main superconductor cable, and a method of making same.

The above and other objects and advantages of the present invention will become apparent from the following detailed description, the accompanying drawings, and the appended claims.

In the drawings, FIG. 1 is a partially broken away perspective view of the present superconductive shunt;

Figures 1, 2:
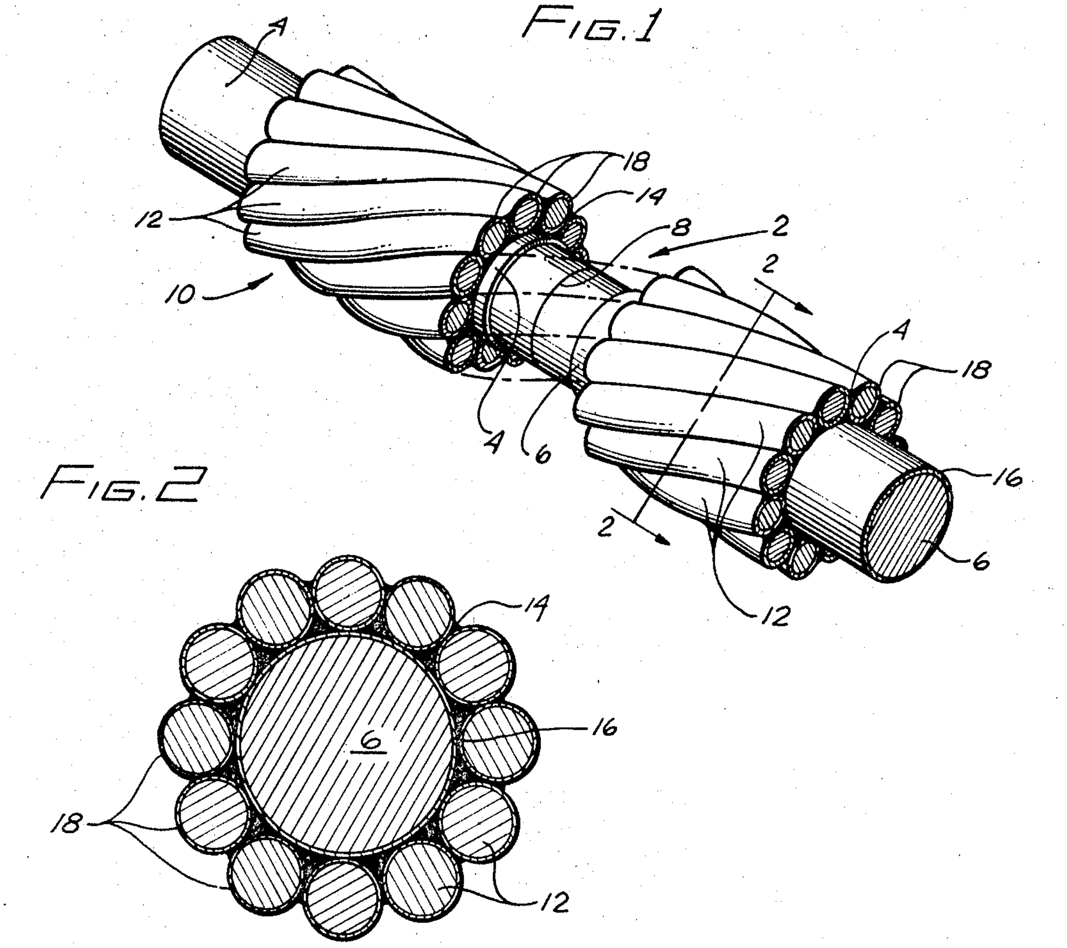
FIG. 2 is a section through FIG. 1.

With reference to FIGS. 1 and 2, it is seen that the present superconductive joint comprises a central, relatively large diameter superconductor wire 2 composed of two superconductor wires 4 and 6 joined at the ends thereof, for example by butt welding. The welding damages or destroys superconducting properties at the interface 8 between the wires. A superconductive shunt 10 is provided around interface 8 by means of a plurality of stranded superconductor wires 12. The strands preferably are of the same superconductor material as the main wire 2 and have been given the same metallurgical treatment in terms of heat treating, cold working, or the like. The strands may, however, be of a different material; the essential point is that the supercurrent carrying capacity of the shunt be at least equal to that of the main superconductor.

By the use of the plurality of small superconductor wires 12, a physically stronger joint is obtained as well as one which is more compact and efficient with respect to passage of supercurrent. The shunt wires 12 are preferably wound about the main conductor in a helical pattern, for example 1 to 2 turns of wire per 1 to 2-inch length, to achieve a physically stronger joint where the wires have less tendency to unstrand. The wires are further held in position about main superconductor wire 2 by means of a potting material 14, for example a solder such as 96% Sn-4% Ag, indium, lead-tin, or lead-bismuth, which solders melt at temperatures below the heat treatment temperature of the superconductor alloy.

The provision of a relatively large number of small superconductor wires in the shunt, for example 10–18, serves to provide not only a stronger joint, but one with a minimum increase in overall diameter. This is particularly important for packing purposes in fabrication of a multistrand superconductor cable, such as one where a central superconductor wire is stabilized by means of a plurality of normal wires of copper or the like in the cable. The normal metal strands in such a larger cable serve as an electrical and heat sink, and it is desirable that the packing not be upset by means of large diamater, noncircularly symmetric superconductor joints. The shunt superconductor wires should have a combined cross section area at least equal to and preferably approximately 10–20 percent larger than the equivalent cross section area of the main superconductor cable in order to serve as an efficient current shunt.

The main superconductor wire and the superconducting strands are each suitably clad with a normal metal 16 and 18, respectively, conventionally of copper or of another good thermal and electrical conductor. The normal metal cladding serves as an electrical insulator between adjacent turns of superconductor wire in a solenoid in a superconductive state, thereby preventing short circuiting between adjacent turns of wire and also as a heat sink in the event of an SN transition. The copper cladding serves an additional function in the present invention in that physical contact may be more readily made between the central wire and the shunt strands. Thus, a copper-to-copper bond may be made by such means as the aforesaid solders, and the resulting assembly has more physical integrity. Direct contact between superconductor wires themselves would be more difficult to achieve and maintain. The central conductor is, however, not copper clad near joint 8. The reason for this is that while various joining means may be employed, it is preferred to make metal-to-metal contact between the adjoining ends of wires 4 and 6 by butt welding without a filler material, and such is best achieved by stripping the copper cladding 16 a short distance from the ends thereof, for example by chemical etching about ⅛ in. back with aqueous nitric acid.

Figure 3:
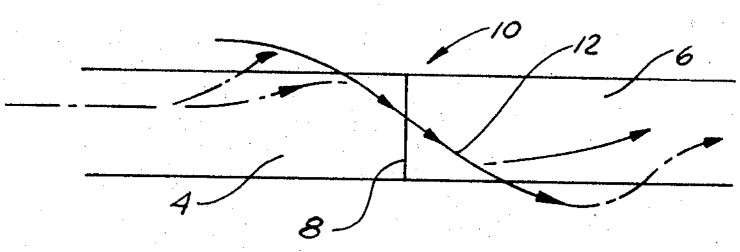
FIG. 3 is a schematic representation of the current path through the shunt region shown in FIGS. 1 and 2.

The current path followed through the shunt is shown schematically in FIG. 3. Current flowing axially through the central wire 4 shifts radially to wire strands 12 of shunt 10, moves along the helical path of each wire across the welded interface region 8, and thereafter at the end of the shunt section reenters main wire 6. The path followed by the current from superconductor wire 4 to superconductor wire 6 can best be seen with reference to FIG. 2 and is, in order: main superconductor 6; copper cladding 16 of main superconductor 6; solder 14; copper cladding of strand of shunt 18; strand superconductor 12; and reverse order of foregoing steps.

Because there is passage of current through the normal metal cladding of the main superconductor and the claddings of the shunt strands, there will be certain consequent $I^2R$ losses and heat generation. By increasing the cross section area and the length of the shunt section, such heat will be dissipated over a greater area. There will accordingly be minimal tendency for the shunt to exceed $T_c$ for the superconducting material and thereby cause an SN transition. Therefore, the shunt should extend at least about three inches on either side of the welded joint, and preferably about 12 inches on either side.

The following example is offered to illustrate the present invention in greater detail.

EXAMPLE

A joint was made between the ends of two 0.04-in. titanium-22 a/o niobium superconductor alloy wires having a 0.003-in. copper cladding. The ends of the large conductor were butt welded together, the copper cladding having first been stripped from the wires in the region of the weld by means of dipping in nitric acid. The large and small wires were all pre-tinned with solder (96% Sn-4% Ag). This prevented oxide boil-off during the subsequent soldering step and avoided the need for strong fluxes which might have subjected the cable to acid attack.

Thirteen 0.10-in. Ti-22 a/o Nb wires having a 0.001-in. copper cladding and the same metallurgical history as the large wire were tied at one end of the main conductor with a small copper wire about 1 ft. from the butt weld. The wires were then stranded with a stranding machine over the length of the large superconductor wire a distance of 1 ft. the other side of the junction and that end was likewise tied with a small copper wire. The wires were wound in a helical pattern with a pitch of about one turn per lineal inch. The stranded joint was then potted with the tin-silver solder, and the copper wire tie-offs were left on both ends.

The resulting superconductor cable was tested in an applied magnetic field of 30,000 gauss at liquid helium temperature. The cable passed a current greater than about 2000 amps. or about 150 amps. per shunt wire. In tests under the foregoing conditions with the same superconductor wire which had been butt welded but not provided with the shunt of the present invention, SN transitions resulted at currents ranging from 105–200 amps.

The foregoing example is illustrative rather than restrictive of the present invention. Variations may be made by those skilled in the art in the techniques of making a superconductor shunt based upon the present teaching which will not depart from the spirit of the present invention. The present invention should be understood to be limited only as is indicated by the appended claims.

I claim:

1. A superconductive joint which comprises:
   (a) two superconductor members which are normal metal clad and joined at respective ends thereof to make one main, continuous superconductor, and
   (b) a plurality of relatively smaller superconductor strands which are normal metal clad and wound about and across the point of juncture of said superconductor members, thereby
   (c) providing a superconductive shunt across said juncture.

2. The joint of claim 1 wherein said superconductor strands are wound about said main superconductor in a helical pattern.

3. The joint of claim 1 wherein said superconductor strands are secured to said main conductor in a solder matrix.

4. The joint of claim 1 wherein said main superconductor and said superconductor strands consist essentially of titanium-niobium alloy clad with copper.

5. The superconductive joint of claim 1 wherein said plurality of strands have a total supercurrent-carrying capacity at least equal to that of said main superconductor.

6. A superconductive joint comprising:
(a) two copper-clad, niobium-titanium alloy superconductor wires having a butt-welded joint at respective ends thereof to form one main, continuous superconductor wire,
(b) a plurality of about 10–18 relatively smaller copper-clad, niobium-titanium alloy wires wrapped in a helical pattern across the juncture between the wires of said main superconductor,
(c) said wires being of the same composition and metallurgical history as said main superconductor and of at least the same total cross sectional area, and
(d) a solder matrix disposed between said main superconductor and said wrapped wires.

7. A method of forming a superconductive joint between two superconductor members which are normal metal clad which comprises:
(a) joining said members at respective ends thereof to form a continuous, main superconductor, and
(b) wrapping and securing a plurality of relatively smaller superconductor wires which are normal metal clad between said members and across the point of contact therebetween, thereby providing a superconductive joint.

8. A method of making a superconductive joint, which comprises:

(a) welding together respective ends of copper-clad titanium-niobium superconductor wire members to make one continuous, main superconductor,
(b) wrapping about 10–18 relatively smaller copper-clad titanium-niobium superconductor strands around said wire members and across said weld therebetween in a helical pattern and extending at least about 3 inches on either side of the welded joint,
(c) said strands having a total supercurrent-carrying capacity at least equal to that of said main superconductor, and
(d) soldering the wrapped wire strands and main superconductor together to form a low resistance path between the respective copper claddings.

References Cited

UNITED STATES PATENTS

| | | | |
|---|---|---|---|
| 2,936,257 | 5/1960 | Nailer et al. | |
| 3,309,457 | 3/1967 | Emery et al. | 174—94 |
| 3,349,169 | 10/1967 | Donadeieu. | |
| 3,366,728 | 1/1968 | Garwin et al. | 174—113 |

DARRELL L. CLAY, *Primary Examiner.*

U.S. Cl. X.R.

29—599, 628; 174—84; 335—216